June 12, 1951 B. W. KEESE 2,556,194
MOTOR VEHICLE DRIVING MECHANISM
Filed Aug. 28, 1945 2 Sheets-Sheet 1

INVENTOR
Beverly W. Keese,
Strauch & Hoffman,
ATTORNEY

June 12, 1951     B. W. KEESE     2,556,194
MOTOR VEHICLE DRIVING MECHANISM

Filed Aug. 28, 1945     2 Sheets-Sheet 2

Inventor
Beverly W. Keese,
By Strauch & Hoffman,
Attorney

Patented June 12, 1951

2,556,194

UNITED STATES PATENT OFFICE 2,556,194

MOTOR VEHICLE DRIVING MECHANISM

Beverly W. Keese, Oshkosh, Wis., assignor to The Timken-Detroit Axle Company, Detroit, Mich., a corporation of Ohio Application August 28, 1945, Serial No. 613,046

7 Claims. (Cl. 74—700)

This invention relates to transmission and power take-off mechanism, particularly designed for use in connection with farm tractors and similar vehicles.

It is the general object and purpose of my present invention to provide certain improvements over the mechanism disclosed in my pending application Serial No. 524,600, filed March 1, 1944, now Patent No. 2,537,060, dated January 9, 1951, whereby a desirably low center of gravity of the engine or motor and the transmission and power take-off units is obtained.

As shown in the pending application, in accordance with customary practice, the power input shaft of the transmission is mounted above the power output shaft and is also located above the horizontal plane of the wheel driving axle. In the present invention, this arrangement is reversed and the power input shaft is mounted below the output shaft of the transmission in alignment with the engine or motor shaft and appreciably below the horizontal plane of the wheel axle. Preferably, the axis of the transmission output shaft is disposed in a common horizontal plane with the axis of the differential unit driven thereby and the axis of the wheel driving axle. This arrangement provides a very low center of gravity of the engine and driving mechanism in the vehicle frame with the smooth transmission of power through the change speed gearing connecting the transmission input and output shafts to the final axle drive gearing.

It is another object of the invention to provide a transmission input shaft in the form of a sleeve carrying change speed gears and adapted to be detachably coupled by suitable clutch mechanism at its forward end with the engine fly wheel together with a constantly rotating extension of the engine shaft extending through the transmission input shaft and means for releasably establishing a driving connection between the rear end of said constantly driven shaft and the power take-off unit.

A further object of the invention resides in the provision of suitable housing structure for the transmission, differential and final axle drive unit with a novel mounting and arrangement of the power take-off unit on the rear end of said housing structure and with the axis of the power take-off shaft disposed substantially in the horizontal plane of the axis of the wheel axle.

An additional object of the invention is to provide a housing structure for the power take-off unit mounted on the rear end of the axle housing whereby a simplified system of lubrication is provided and a common oil bath level maintained upon the transmission gearing, the final axle drive gearing and the power take-off gearing.

The present invention further comprehends a transmission and power take-off mechanism as above characterized in which the several parts are of simple and rugged structural form providing maximum efficiency in operation, reasonably low production cost and minimum maintenance expense.

A further object of the invention is to provide a novel power take-off arrangement for a tractor or the like wherein the drive of the power take-off is a direct function of the engine speed.

With the above and other objects in view, the invention comprises the improved transmission and power take-off mechanism as will hereinafter be more fully described, illustrated in the accompanying drawings and subsequently incorporated in the subjoined claims.

In the drawings, wherein I have disclosed one desirable practical embodiment of the present invention and in which similar reference characters designate corresponding parts throughout the several views.

Figure 1:
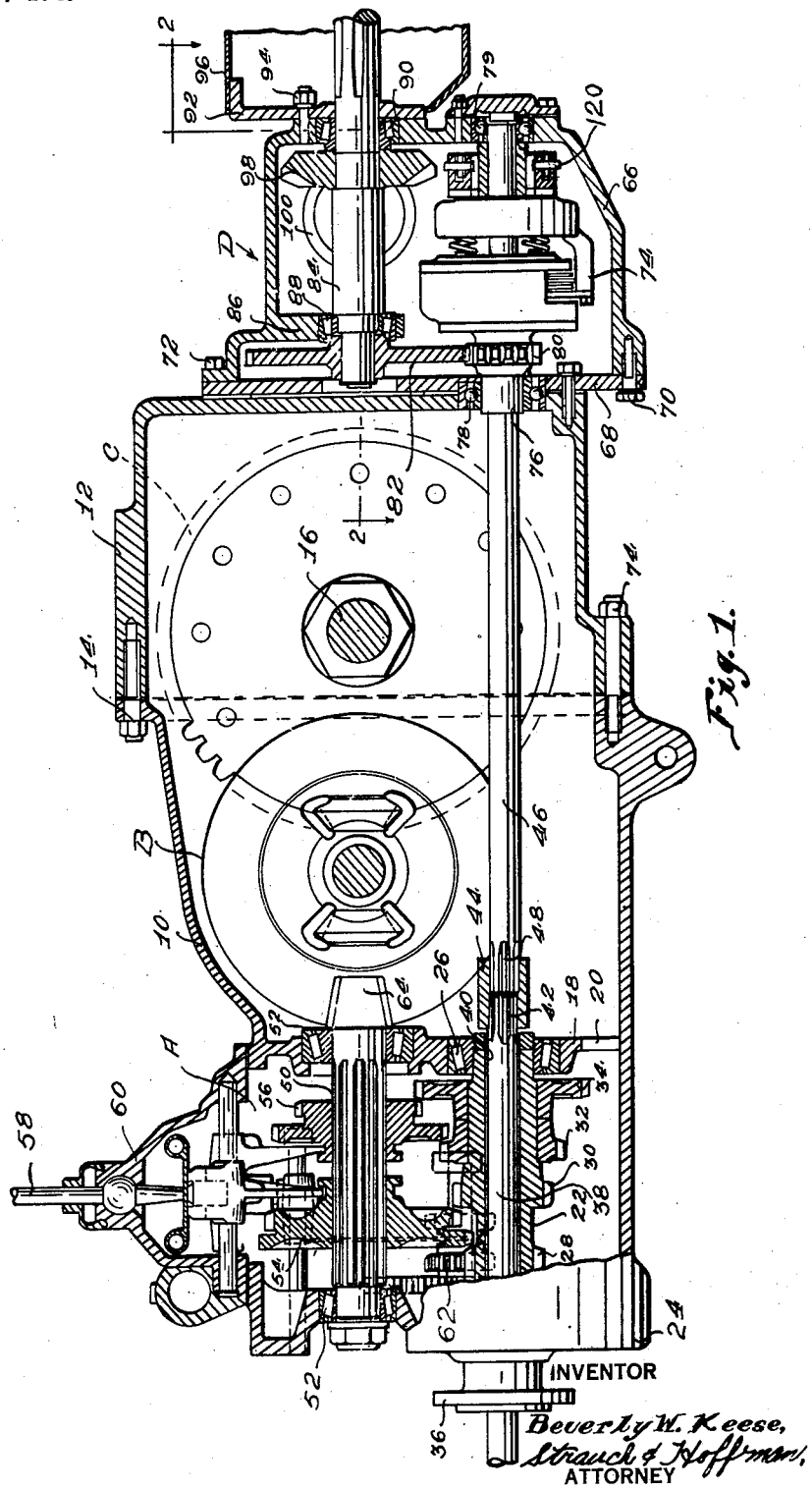
Figure 1 is a vertical sectional view on the lontudinal center line of the vehicle.
Figure 2:
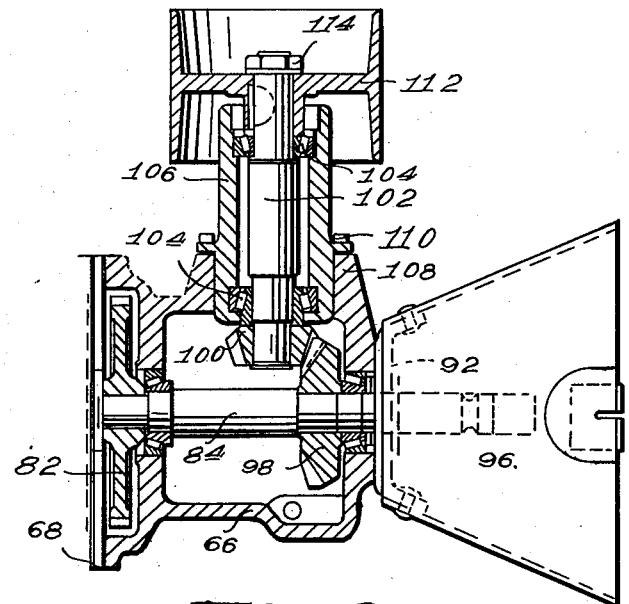
Figure 2 is a horizontal sectional view taken substantially on the line 2—2 of Figure 1 illustrating details of the power take-off.

In the illustrated embodiment of the invention, I have shown the transmission unit A and the differential unit B mounted in a common housing structure 10 while the final axle drive gearing C is mounted in a separate housing 12 rigidly secured to the flanged rear end of the housing structure 10 as by the bolts indicated at 14. To opposite sides of the housing 12, the usual tubular axle arms (not shown) are suitably connected and enclose the drive axle shafts for the vehicle wheels, one of which is indicated at 16.

The forward portion of housing structure 10 containing the variable speed transmission gearing is separated from the rear portion thereof containing the differential unit B by means of the internal wall or partition 18 which is provided at its lower end with the opening 20 for the free flow of lubricant between the housing compartments.

The transmission unit A includes the tubular power input shaft or sleeve 22 which is coaxial with the engine shaft (not shown) of the tractor and rotatably supported or journalled at its opposite ends in the partition wall 18 and the front end wall 24 of the housing structure 10 by means of suitable anti-friction bearings, one of which is indicated at 26. This input shaft carries a plurality of longitudinally spaced, relatively fixed change speed gears 28, 30, 32 and 34 respectively, and is provided at its forward end with the flange 36 through which driving power is transmitted to said input shaft from the engine fly wheel (not shown) by means of suitable conventional clutch mechanism. A constantly driven shaft 38 extends rearwardly from the engine shaft and through the tubular transmission input shaft 22. Suitable bearing bushings are interposed between the ends of the tubular shaft 22 and the shaft 38, as shown at 40. The rear end of the shaft 38 is splined as at 42 to enter one end of the internally splined sleeve 44 non-rotatably but detachably coupling said shaft 38 to the splined end 48 of a coaxial drive shaft 46 for the power take-off unit to be later more fully described.

Above the input shaft 22, the transmission output shaft 50 is journalled at its opposite ends in the housing walls 18 and 24 by means of the anti-friction bearings 52. Gear clusters 54 and 56 are splined on the shaft 50 and are axially shiftable thereon for selective engagement with the gears 28, 30, 32 and 34 on the power input shaft. The shift lever 58 for the gear clusters is operatively mounted in the bonnet casting 60 which closes an opening in the top wall of the housing structure 19. A reversing gear cluster 62 is also provided for connecting the gear 28 with one of the gear elements of the gear cluster 54. Since the gear shifting mechanism is substantially the same as that disclosed in my pending application above identified and does not per se comprise part of the present invention, further detailed description of the same herein is unnecessary to understanding of the invention. The rear end of the power output shaft 50 is provided with a usual bevel drive pinion 64 for the differential unit B.

The power take-off unit D includes the housing 66 having a front open end with a closure plate 68 therefor detachably secured to the body wall of the housing by suitable bolts indicated at 70 and providing a mounting plate for said take-off unit upon the rear vertical end wall of the housing 12 to which said housing 66 is detachably secured by the bolts indicated at 72.

The drive shaft 46 for the power take-off unit extends rearwardly through aligned openings in the rear end wall of the housing 12 and the plate 68. A conventional clutch of the disk type generally indicated at 74 has the clutch disks thereof splined to the shaft 46, the driven element of said clutch unit being provided with the sleeve extension 76 mounted in a suitable anti-friction bearing 78 located in the registering openings in the plate 68 and the housing wall 12. The rear end of the shaft 46 is mounted in the anti-friction bearing 79 in the rear end wall of the housing 66.

The sleeve extension 76 of the driven clutch element is provided with a pinion 80 in constant mesh with the relatively large gear 82 fixed to the forward end of the power take-off shaft 84 which is journalled in the anti-friction bearing 88 mounted in the web 86 depending from the top wall of the housing 66. The shaft 84 is also journalled in anti-friction bearing 90 mounted in the rear end wall of housing 66 and extends rearwardly therefrom. Shaft 84 is coaxial with transmission output shaft 50 and in the same horizontal plane as the differential and drive axle axes. A flanged bracket member 91 is securely bolted as at 94 to the housing 66 and to said bracket member one end of the flaring hood 96 is riveted or otherwise securely attached. This hood is adapted to enclose a suitable coupling connection between the rear end of take-off shaft 84 and the drive shaft of an auxiliary machine.

Within the housing 66 a bevel gear 98 is fixed to the shaft 84 and is in constant mesh with a similar bevel gear 100 to the inner end of a shaft 102 disposed at right angles to the shaft 84 and journalled in anti-friction bearings 104 mounted in the opposite ends of a support sleeve 106 fitted at one of its ends in an opening 108 in the side wall of housing 66 and provided with an external flange 110 securely bolted to said housing wall. To the outer end of the shaft 102 a drum or pulley 112 is keyed and retained thereon by means of the nut 114 threaded upon the reduced end of the shaft 102.

Figure 3:
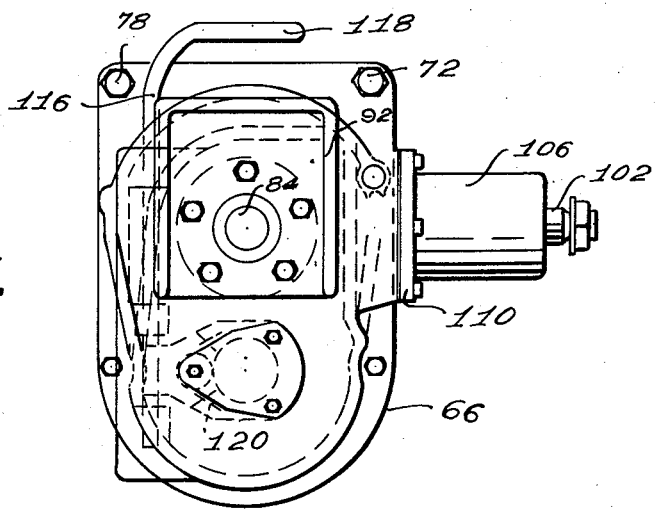
Figure 3 is a rear end elevation of the power take-off unit.

As illustrated more clearly in Figure 3 of the drawings, the clutch unit 74 is actuated to release the driving connection between shaft 46 and gear 80 by means of the vertically disposed rod 116 rotatably mounted in suitably spaced internal bearing lugs on the housing 66 and provided at its upper end with a laterally disposed handle portion 118. To the lower end of this rod the shifting fork 120 is suitably fixed, the arms thereof being pivotally connected in the usual manner with the axially shiftable clutch releasing member.

From the above description and the accompanying drawings, the construction and several advantages of my present invention will be clearly understood. First, it will be seen that by reason of the low level mounting of the motor and the power input shaft of the transmission, with the transmission output shaft disposed substantially in the horizontal plane of the vehicle wheel axle, a very low center of gravity is obtained. Also since the power take-off unit is driven from the shaft 38 which is coaxial with the transmission input shaft, the greater portion of the weight of said power take-off unit is also located below the wheel axles. This power take-off unit being mounted on the rear end of the axle housing partially counterbalances the weight of the transmission and differential units and tends to neutralize excessive stresses which might otherwise be transmitted through the wheel axle and the housing structure to the driving elements of said units.

It will be further noted that while the vehicle is in motion and the transmission input shaft 22 is driven from the engine fly wheel, with the clutch 74 engaged, the power take-off unit will also be driven by the motor through the shafts 38 and 46 to operate a pump or other accessory apparatus carried by the tractor through suitable driving connections with the pulley 112. The speed at which pulley 112 is driven remains a function of the engine speed under all conditions of operation and is thus susceptible to close control. Of course, when it is not desired to operate the power take-off it may readily be disconnected from the engine driven shaft 38 by actuating rod 116 to release the clutch 74. Further, it will be obvious that the power take-off may also be operated independently of the transmission when the vehicle is stationary by disengaging the clutch which connects shaft 22 with the engine fly wheel. A thresher or other machine may then be driven by the pulley 112, or other auxiliary machines remote from the tractor operatively coupled with the rear end of the power take-off shaft 84 and driven thereby.

It will be appreciated that the above noted purposes of the present invention are accomplished by means of a relatively simple mechanism, the several cooperating elements of which may be easily and quickly assembled into a smoothly functioning organization. Of course when it is not desired to equip the machine with the power take-off unit, this unit may be readily detached from the rear end of the axle housing and bodily removed therefrom together with its drive shaft 46, and sealing off the rear wall of housing 12. Thus the invention provides a mechanism of this kind having maximum untility. Adequate lubrication is insured from a single source of supply, as the lubricating oil may freely flow through the opening 20 from the transmission compartment into the differential and final axle drive compartment of the housing and through bearing 78 into the housing 66 of the power take-off unit. In this manner a constant uniform oil bath level is maintained on the gearing in the several housing compartments. Thus frictional wear is reduced to a minimum with quiet operation and reasonably low operating and maintenance expense.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with vehicle axle drive mechanism including a differential unit and final drive gearing, a transmission unit comprising a tubular power input shaft adapted for detachable connection with an engine power shaft, a power output shaft and change speed gearing operatively connecting said input and output shafts, housing structure for said transmission, differential and final drive gearing, a second engine driven shaft extending through said tubular power input shaft, a power take-off unit mounted on the rear end of said housing structure, said unit including means coaxially aligned with said engine driven shaft for releasably establishing a driving connection between the rear end of said second engine driven shaft and the power take-off unit.

2. The combination defined in claim 1, in which the transmission input shaft, said second engine driven shaft and the driving connection with the power take-off unit are mounted in coaxial relation below the vehicle wheel axle, and wherein said power take-off unit includes a power take-off shaft having its axis disposed substantially in a common horizontal plane with the axis of the vehicle wheel axle.

3. In combination with vehicle axle drive mechanism, including a differential unit and final drive gearing, a transmission unit comprising a power output shaft having a driving connection at one end with the differential unit and a tubular power input shaft mounted below said output shaft in parallel relation therewith and adapted for detachable connection with an engine power shaft, an engine driven shaft extending through said tubular power input shaft, housing structure for said transmission, differential and final drive gearing, a power take-off unit comprising a housing and means detachably mounting said housing on the rear end of said housing structure, and means for establishing a releasable driving connection between the power take-off unit and said engine driven shaft, including a power take-off drive shaft disposed in a horizontal plane below the wheel axle, and means detachably coupling said power take-off drive shaft to the rear end of the engine driven shaft.

4. The combination defined in claim 3, in which the power take-off unit includes a power take-off shaft and wherein the axes of the transmission output shaft, the differential, the drive wheel axle and said power take-off shaft are disposed substantially in a common horizontal plane.

5. In combination with vehicle axle drive mechanism including a differential unit and final drive gearing, a transmission unit comprising a power out-put shaft having a driving connection at one end with the differential unit and a power input shaft mounted below said out-put shaft in parallel relation therewith and adapted for detachable connection with an engine power shaft, an engine driven shaft operable independently of the transmission in-put shaft, housing structure for said transmission, differential and final drive gearing, a power take-off unit comprising a housing mounted on the rear end of said housing structure, and means for establishing a releasable driving connection between the power take-off unit and said engine driven shaft mounted in said power take-off housing and including a power take-off drive shaft disposed in a horizontal plane below the vehicle axle.

6. In a combined vehicle drive and power take-off assembly, a housing, a transmission unit therein having an in-put shaft adapted to be releasably coupled to the vehicle engine power shaft, a power take-off drive shaft extending through said housing and connected with and directly driven by the engine power shaft, a power take-off shaft, housing structure therefor demountable from said housing and having means journalling said take-off shaft and said drive shaft therein, a drive gear for said take-off shaft rotatably mounted on said drive shaft, and means in said housing structure for releasably establishing a driving connection between said gear and said drive shaft and demountable as a unit with the housing structure and power take-off shaft.

7. In a combined vehicle drive and power take off assembly, a housing, transmission and final drive mechanism therein, said transmission having an input shaft adapted to be releasably coupled to the vehicle engine power shaft, a sectional power take off drive shaft extending through the housing and having a first section connected with and directly driven by the engine power shaft and a second section coaxial with and coupled for direct drive with said first section, a power take off shaft, housing structure therefore demountable from said housing and having means journalling said take off shaft and said second drive shaft section therein, a drive gear for said take off shaft rotatably mounted on said second drive shaft section, and means in said housing structure for releasably establishing a driving connection between said gear and said second drive shaft section; said housing structure, said power take off shaft, said drive shaft second section, said drive gear, and said means for releasably establishing a driving connection between said gear and said second drive shaft section all being demountable as a unit relative to said housing and said first drive shaft section.

BEVERLY W. KEESE.

REFERENCES CITED

The following references are of record in the file of this patent:

UNITED STATES PATENTS

| Number | Name | Date |
|---|---|---|
| 1,139,674 | Gruenfeldt | May 18, 1915 |
| 1,175,251 | Fleury et al. | Mar. 14, 1916 |
| 1,961,809 | Wood | June 5, 1934 |
| 2,027,013 | Barnes | Jan. 7, 1936 |
| 2,140,687 | Brown | Dec. 20, 1938 |
| 2,168,033 | Johnston et al. | Aug. 1, 1939 |
| 2,448,822 | Pinardi et al. | Sept. 7, 1948 |